May 27, 1969  J. E. SAMUELS  3,446,631
RICE PACKAGE
Filed Sept. 13, 1965

INVENTOR.
Jack E. Samuels
BY
Robert B. Ingraham
AGENT

United States Patent Office 3,446,631
Patented May 27, 1969

3,446,631
RICE PACKAGE
Jack E. Samuels, Cleveland, Ohio, assignor to The Dow Chemical Company, Midland, Mich., a corporation of Delaware
Filed Sept. 13, 1965, Ser. No. 486,690
Int. Cl. B65b 25/00
U.S. Cl. 99—171        4 Claims

ABSTRACT OF THE DISCLOSURE

An improved ink-retaining rice package is provided from a film having external layers of polyethylene and an internal layer of a vinylidene chloride polymer. In such a package, rice keeps well and printing ink on the outer surface of the package is not detached over a period of time.

---

Figure 1:
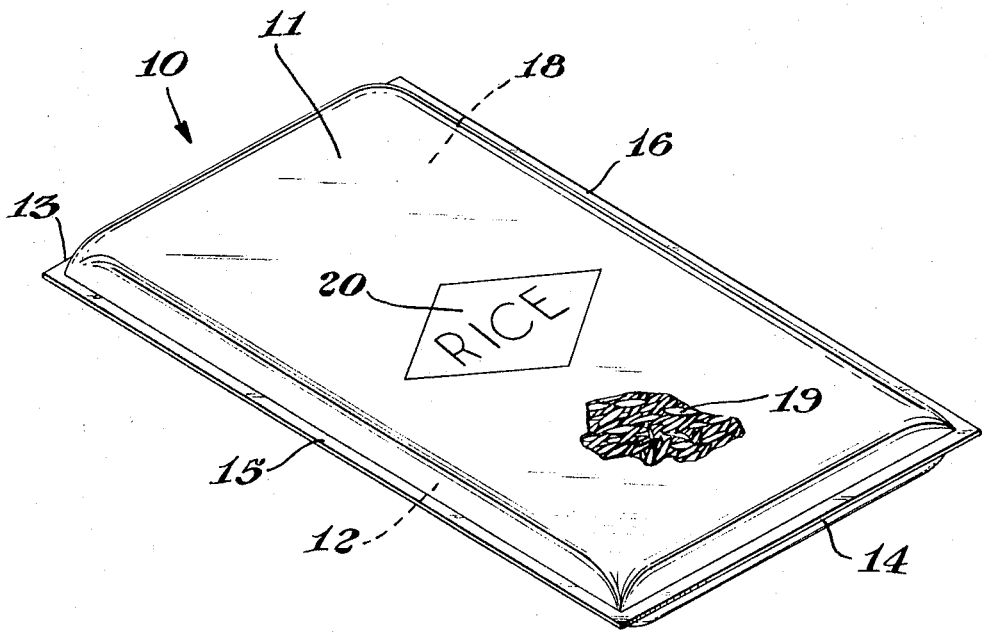

This invention relates to an improved rice package and more particularly relates to an improved synthetic resinous thermoplastic film package containing rice.

The term "rice," as used herein, designates unpolished or unconverted rice and polished and converted rice. Considerable difficulty has been encountered in the packaging of rice particularly the unpolished rice in transparent attractive packages.

It is particularly desirable and beneficial to package rice in an attractive manner in moisture-proof, transparent bags containing quantities such as 1, 2, 5 or even 25 pounds of rice. From a commercial standpoint, it is extremely desirable that such bags be printed with an attractive and decorative label. Rice of both polished and unpolished varieties has been packaged in various transparent packages generally consisting of one or more layers of a transparent material and subsequently the bags are overprinted. Oftentimes, such bags are underprinted, that is, the printing or decorative material is disposed between adjacent layers. Underprinting of bags is a relatively expensive procedure and generally undesirable. Rice packaged in a single layer bag, that is, a bag prepared from a single layer of film and printed on the outer surface has generally been found unsatisfactory as the rice oils penetrate from the inside of the package and tend to cause the printing to be disfigured. Rice oils generally cause ink or lacquer to separate from the surface of the package. Further, it is essential in the packaging of rice for long term storage that the rice be protected from moisture, that is, the package must present a relatively good barrier to moisture vapor as well as rice oils. Rice requires a package of considerable physical strength to withstand mechanical handling and shipping.

It would be advantageous if there were available an improved rice package. It would also be advantageous if there were available a package formed from a single film which would permit heat sealing and provide a barrier for the rice oils. It would also be advantageous if such a package would provide long term protection from rice and permit overprinting on the external surface of the package. It would also be advantageous if there were available an improved rice package of a transparent material.

These benefits and other advantages, in accordance with the present invention, are achieved in a rice package, in accordance with the present invention, which comprises a flexible synthetic resinous thermoplastic film having a thickness of from about 0.75 to about 8 mils, the film defining a first panel and a second panel, the second panel being affixed to the first panel and defining a hermetically sealed space therebetween, containing rice, wherein the film of the first and second panels comprises a plurality of layers adhered to each other, the outer or surface layers being a polyolefin and at least one inner layer is a barrier for water vapor, oxygen, rice oil and the like.

Packages, in accordance with the present invention, are readily prepared utilizing a variety of synthetic resinous materials, however, it is essential and critical that the material from which the rice package of the present invention is formed by a synthetic resinous film or sheet having a thickness of from about 0.75 mil to about 8 mils and preferably having a thickness of from about 1.0 to about 3 mils. When this material from which the package is formed is thinner than about 0.75 mil, there is an insufficient mechanical protection for the rice or the desirable durability when carried in shipping. When the thickness of the film exceeds about 8 mils, it is too stiff for convenience and handling. Beneficially, films having a thickness of from about 1 to about 3 mils are preferred wherein the resultant package is neither too stiff nor too limp and provides adequate mechanical protection for the material therein. Advantageously, the film or sheet utilized in preparing the packages comprises at least three layers of synthetic resinous thermoplastic material. Beneficially, each of the layers is transparent to afford ready inspection of the product contained therein without the necessity of breaking the hermetic seal. The inner or central layer of the film is formed from an oxygen and moisture vapor barrier resin such as halogenated hydrocarbon resins such as polymers of vinylidene chloride containing minor proportions of other monomers copolymerizable therewith.

By the term "polyolefin" is meant polyethylene, polypropylene, resinous copolymers of ethylene and propylene, copolymers of ethylene and/or propylene with minor proportions of olefinically unsaturated monomers such as, for example, those alpha-olefins having from 2 to 8 carbon atoms such as 1-butene, 1-pentene, 1-hexane, 1-heptene, 1-octene and mixed higher alpha-olefins. Other hydrocarbons useful for making copolymers with ethylene and propylene including divinylbenzene, allene, dimethallyl, and isopentene. Comonomers which can broadly be used include mono-substituted ethylenes such as 1-pentene, vinylcyclohexane, allyl benzene, $C_8$–$C_{14}$ mixed alpha-olefins, styrene, allyl naphtlane and the like, 1,1-disubstituted ethylenes such as alphamethyl styrene, 2-methyl-butene-1, mixed alpha- and betapinenes, camphene and the like, 1,2-disubstituted ethylenes such as indene, acenaphthylene, cyclopentene, norbornylene, cyclohexene, trans-stilbene, 2-pentene and the like, conjugated dienes and trienes such as pentadiene, 1,2-dihydrobenzene, alloocimene, and cyclopentadiene, unconjugated dienes such as mixed octadienes, hexadiene-1,5, 2,5-dimethylhexadiene-1,5, 1,4-dihydrobenzene, bicycloheptadiene, bicyclopentadiene, 4-vinylcyclohexane-1, and 4,7-diphenyl decadiene-1,9, acetylenes such as isopropenyl acetylene and phenyl acetylene, chloroolefins such as beta-methallyl chloride and chloromethyl norbornylene, and m-chlorostyrene, ethers and epoxides, esters such as vinyl butyrate, vinyl acetate, and methyl acrylate, and nitrogen compounds such as vinyl carbazole, 4-vinyl pyridine and acrylonitrile, and mixtures and blends thereof.

A wide variety of barrier materials may be employed in the central layer of films in accordance with the present invention. Particularly suited as barrier layers are combinations of vinylidene-chloride polymers, vinyl-chloride polymers, vinylidene-fluoride polymers and extrudable mixtures thereof. The requirement for the central layer is that the material be extrudable within a sheath of another polymer and that the composition have the desired gas and moisture vapor transmission barrier characteristics.

Particularly advantageous and beneficial are extrudable compositions of vinylidene-chloride polymers, wherein the polymers contain at least about 70 weight percent vinylidene-chloride, the remainder being one or more olefinically unsaturated monomers copolymerizable therewith. Suitable vinylidene-chloride copolymers are prepared utilizing such comonomers as methyl, ethyl, isobutyl, butyl, octyl and 2-ethylhexyl acrylates and methacrylate; phenyl methacrylate, cyclohexyl methacrylate, p-cyclohexyl phenyl methacrylate, chloroethyl methacrylate, 2-nitro-2-methylpropyl methacrylate, and the corresponding esters of acrylic acid; methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, acrylamide, methacrylamide or monoalkyl substitution products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride and allyl glycidyl ether. Commercially available light stabilizers may also be incorporated in the vinylidene chloride material such as tertiary-butyl Salol. Other barrier compositions which may be used with benefit in films in accordance with the present invention are vinyl chloride polymers which contain a predominant amount of vinyl chloride therein and beneficially, fluorocarbon polymers, fluorohydrocarbon polymers and fluorohalohydrocarbon polymers may also be used with benefit. Such materials as polyvinyl chloride, polyvinylidene fluoride, chlorinated polyethylene and polymers of such materials as vinylidene fluoride, vinylidene fluoride and chlorotrifluoroethylene, chlorotrifluoroethylene and vinylidene fluoride, chlorotrifluoroethylene and vinyl chloride, chlorotrifluoroethylene vinylidene fluoride and tetrafluoroethylene and the like. Generally, for economic reasons, the vinylidene chloride polymers are employed, as they are most readily available at relatively low cost.

In the extrusion of the vinylidene polymers, it is frequently advantageous and beneficial to incorporate therein a minor portion of a plasticizer, oftentimes a heat stabilizer and a light stabilizer. Such additives are well known in the art and generally are found advantageous in that the temperature required for the extrusion is substantially reduced and the probability of decomposition of the polymer in the extruder is lowered. Typical plasticizers which are employed in the vinylidene or saran combinations are acetyl tributyl citrate, epoxidized soyabean oil (commercially available under the trade designation of Paraplex G-60) and dibutyl sebacate.

Beneficially, in certain instances, it is desirable to add adhesive or bonding layers between the barrier layer and the outer polyolefin layer. The nature of such bonding or adhesive layers must be such that the adhesion between the outer and inner layer is increased as increased seal strength and resistance to delamination are to be obtained.

Many polymers may be employed for the purpose and coextruded simultaneously as the film is formed to provide five-layer film, wherein the outer layers are of a polyolefin layer, such as polyethylene, polypropylene, and the resinous copolymers of ethylene and propylene.

The adhesive layer often will vary in thickness from about 0.05 to about 0.8 mil; however, generally the preferred range of adhesive layer thickness is from about 0.1 to about 0.3 mil in thickness. Oftentimes the strength of the bond between the inner or core layer and the outer or surface layer increases slowly as the thickness of the adhesive layer is increased, and generally little or no increase in the bond strengths occurs after the thickness of the bonding layer has reached 0.5 to 0.6.

A wide variety of polymers and polymeric compositions are useful to increase the adhesion between the polyolefin outer layer and the inner barrier layer. Suitable polymers or polymeric compositions are readily selected by determining the bonding strength of the composition being evaluated by forming a two-layer extrusion. The bond strength of the resultant two-layer laminate is readily determined by conventional peel strength tests. Similarly, the adhesive layer composition is evaluated by a similar extrusion utilizing the polyolefin material.

Of great help in selecting the proper adhesive layer material are the solubility parameters or gamma values. Solubility parameters or gamma values are discussed in "Some Factors Affecting the Solubility of Polymers" by P. A. Small, *Journal of Applied Chemistry*, 3, 71 (1953) and also in "Solubility Parameters" by Harry Burrell in the Interchemical Review, 14, 3–16, 31–46 (1955). For example, some gamma values of typical polymers are polytetrafluoroethylene 6.2; polypropylene 7.2; polyethylene 7.9; butadiene/styrene 8.1; polystyrene 9.1; polyethyl acrylate 9.2; chlorinated polyethylene (35 weight percent chlorine) 9.3; polyvinylacetate 9.4; polyvinyl chloride 9.7; 76 percent styrene and 24 percent acrylonitrile 10.1; chlorostyrene 10.5; 85 percent vinylidene chloride and 15 percent vinyl chloride 12.2; and polyacrylonitrile 15.4. Generally, adhesion is obtained when a polymer is selected having gamma values which are within about 3 units of each of the materials to be adhered. For example, polyethylene and the vinylidene chloride polymer are readily adhered by copolymers having gamma values between 9.2 and about 10.1. In the instance of adhering layers of polyolefins such as polyethylene and polypropylene to vinylidene chloride polymers, polymers which are particularly advantageous are copolymers, from about 13 percent to about 35 weight percent vinyl acetate with from about 87 weight percent to about 65 weight percent ethylene, copolymers of from about 20 to 30 weight percent ethylacrylate with from about 80 to 70 weight percent ethylene, copolymers from about 20 to 30 weight percent isobutyl acrylate with from about 80 to 70 weight percent of ethylene, chlorinated polyethylene containing from about 25 to 40 weight percent chlorine and polyvinyl chloride.

Composite film for the practice of the present invention is readily prepared by heat-plastifying a core-forming polymer and heat plastifying a polyolefin material, such as employed in the outer layers, i.e., while in the heat-plastified condition, deforming the polyolefin to form a layer of polyolefin resin disposed generally about the core-forming resin in the absence of fluid, deforming the heat-plastified materials into a stream, deforming the stream into a film-like configuration, passing the resultant composition heat-plastified stream into a cooling zone and lowering the temperature of the stream below the thermoplastic temperature thereof. Beneficially, apparatus such as illustrated in British Patent No. 985,310 may be employed to form the composite film.

Advantageously, such a film is readily heat sealable under a wide variety of conditions to provide an attractive seal with high resistance to the passage of moisture vapor, oxygen and the like gases.

In FIGURE 1 there is illustrated a package, in accordance with the present invention.

Figure 2:
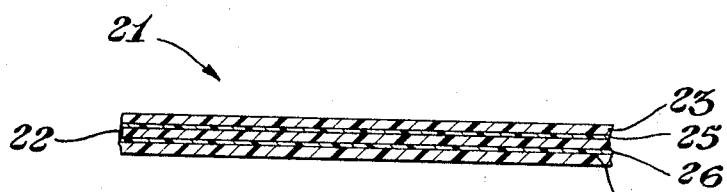

In FIGURE 2 there is an enlarged, exaggerated cross-sectional view of a portion of the film employed to prepare a package of FIGURE 1.

In FIGURE 1 there is illustrated a rice package in accordance with the present invention generally designated by the reference numeral 10. The package 10 comprises a first panel 11 and a second panel 12. The panels 11 and 12 have a generally rectangular configuration and are sealed together in face-to-face relationship by means of a first edge seal 13, a second edge seal 14, a first side seal 15, and a second side seal 16. The panels 11 and 12 define therebetween a space 18 containing rice 19. A decorative overprint 20 is disposed on the outer surface of the panel 11.

In FIGURE 2 there is illustrated a sectional view of a synthetic resinous thermoplastic film 21, the film 21 comprises an interior layer 22 of a transparent barrier material, a first outer layer 23 of a resinous polyolefin such as polyethylene, a second outer layer 24 also comprising a resinous polyolefin. A pair of adhesive layers 25 and 26 which serve to bond the outer layers 23 and 24 to the inner layer 22. Packages, in accordance with the present invention, are readily prepared by heat sealing the thermoplastic resinous film into the configuration of FIGURE 1. Generally, the sealing can be accomplished using conventional hot jaw heat sealers, impulse sealers, hot roll sealers and ultrasonic sealers, wherein a stylus vibrating at ultrasonic frequencies presses the film together to cause bonding thereto.

By way of further illustration, a plurality of packages are prepared having the configuration of FIGURE 1 by cutting a portion of film to a suitable size, forming the side seals 15 and 16 and the edge seal 14, adding one pound of unpolished rice to the package, subsequently sealing the rice within the package by forming the edge seal 13. The one surface of the package is overprinted in a decorative pattern with a lacquer type ink. Storage at 75° F. and 60 percent relative humidity indicates no deterioration of the rice or tendency of the decorative overprint to delaminate. A plurality of packages prepared in the hereinbefore described manner are shipped a distance of 800 miles by motor truck and subsequently returning to its point of origin. Examination of the packages indicated no mechanical failure and that the decorative overprint was also in clearly readable condition with no indication of delamination.

The film employed to prepare the packages consists of polyethylene outer layers having a thickness of 1.53 mils, an intermediate or bonding layer of a copolymer of 72 weight percent ethylene and 28 weight percent vinyl acetate having a thickness of 0.1 mil, a central or barrier layer of 0.2 mil thick consisting of 93.75 parts by weight of a copolymer of 85 weight percent vinylidene chloride and 15 weight percent vinyl chloride, 4.5 parts by weight acetyl tributylcitrate, 1 part by weight of an epoxidized soybean oil commercially available under the trade designation Paraplex G-60, 0.75 part by weight of 4-tertiary-butyl Salol, a similar 0.1 mil thick layer of ethylene-vinyl acetate copolymer and a 1.53 mil layer of polyethylene to provide a coherent five-layer film. Evaluation of such pouches indicates exceptional resistance to drying on prolonged storage. Packages in accordance with the present invention, withstand folding, bending, crumbling, abrasion and the like extremely well and are relatively inexpensive.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A rice package which comprises a flexible synthetic resinous thermoplastic film having a thickness of from about 0.75 to about 8 mils, the film defining a first panel and a second panel, the second panel being affixed to the first panel, the first and second panels defining a hermetically sealed space therebetween, the space containing rice, both the first and second panels consisting essentially of at least five layers of synthetic resinous thermoplastic material, first and second surface layers, an inner layer, and first and second adhesive layers, the adhesive layers disposed adjacent the inner layer, the first and second surface layers adhered, by means of the adhesive layers, to the inner layer, the first and second adhesive and surface layers being coextensive with the inner layer, the outer or surface layers of each of the panels being a polyolefin and the inner layer of each of the panels being a vinylidene chloride polymer.

2. The package of claim 1 wherein a decorative overprint is disposed on an outer surface of the package.

3. The package of claim 1 wherein the outer layers of the first and second panels are polyethylene.

4. A rice package which comprises a flexible synthetic resinous thermoplastic film having a thickness of from about 0.75 to about 8 mils, the film defining a first panel and a second panel, the second panel being affixed to the first panel, the first and second panels defining a hermetically sealed space therebetween, the space containing rice, both the first and second panels consisting of at least five layers, a first outer or surface layer, a second outer or surface layer and an inner barrier layer, first and second adhesive layers adhering the outer layers to the inner layer, the outer or surface layers of each of the panels being a polyolefin and the inner layer of each of the panels being a vinylidene chloride polymer layer, and the adhesive layers being an ethylene vinyl acetate copolymer.

References Cited

UNITED STATES PATENTS

| 2,543,229 | 2/1951 | Chapman | 161—251 |
| 2,828,237 | 3/1958 | Rosser | 53—33 |
| 2,919,059 | 12/1959 | Sporka | 229—3.5 |
| 2,968,576 | 1/1961 | Keller et al. | 117—47 |
| 3,081,174 | 3/1963 | Gay | 99—171 |
| 3,227,605 | 1/1966 | Wolinski | 161—247 |
| 3,274,004 | 9/1966 | Curler et al. | 99—171 |

RAYMOND N. JONES, *Primary Examiner.*

U.S. Cl. X.R.

161—165